United States Patent [19]

Weibelzahl et al.

[11] Patent Number: 4,685,044
[45] Date of Patent: Aug. 4, 1987

[54] METHOD AND APPARATUS FOR SUPPRESSING RESONANCE PHENOMENA IN THE A-C NETWORK ON THE INVERTER SIDE OF A HIGH VOLTAGE D-C TRANSMISSION SYSTEM

[75] Inventors: Manfred Weibelzahl, Uttenreuth; Georg Wild, Langensendelbach; Kadry Sadek, Lauchringen, all of Fed. Rep. of Germany

[73] Assignee: Siemens Aktiengesellschaft, Berlin and Munich, Fed. Rep. of Germany

[21] Appl. No.: 763,466

[22] Filed: Aug. 7, 1985

[30] Foreign Application Priority Data

Aug. 30, 1984 [DE] Fed. Rep. of Germany ....... 3431979

[51] Int. Cl.[4] .............................................. H02H 7/00
[52] U.S. Cl. ......................................... 363/51; 363/35
[58] Field of Search ........................ 363/35, 37, 39, 51

[56] References Cited

U.S. PATENT DOCUMENTS 4,555,750 11/1985 Matsumura et al. ................... 363/37
4,591,963  5/1986 Retotar ................................. 363/37

OTHER PUBLICATIONS

Patterson, Neal A., Carrier Frequency Interference from HUDC Systems, IEEE Transactions on Power Apparatus and Systems, vol. PAS-104, No. 11, Nov. 1985, pp. 3255-3261.

Primary Examiner—Peter S. Wong
Assistant Examiner—Judson H. Jones
Attorney, Agent, or Firm—Kenyon & Kenyon

[57] ABSTRACT

If in a high-voltage d-c transmission system (HVDCTS), a resonance frequency of an a-c voltage network (NB) connected to the inverter (1B) is located in the vicinity of a voltage component contained in the a-c voltage network, a resonance frequency which often cannot be compensated by a current regulator controlling the rectifier stage (1A) is coupled into the d-c circuit of the HVDCTS via the inverter. Therefore, resonance phenomena which requires an emergency shutdown of the HVDCTS are generated. Therefore, a pilot quantity ($U'_d$) is formed with a defined phase shift relative to the resonance oscillation of the HVDCTS voltage and added to the output of the current regulator. Thereby, a constant HVDCTS current can be generated for a given operating point and the resonance in the a-c voltage network (NB) can be damped. If the resonance oscillation is determined by two quantities ($U'_d$, $i'_d$) of, respectively, the HVDCTS voltage as well as of the HVDCTS current, stable damping of the resonance phenomena can be achieved by the pilot control described with the two quantities even for deviating operating points.

13 Claims, 2 Drawing Figures

METHOD AND APPARATUS FOR SUPPRESSING RESONANCE PHENOMENA IN THE A-C NETWORK ON THE INVERTER SIDE OF A HIGH VOLTAGE D-C TRANSMISSION SYSTEM

BACKGROUND OF THE INVENTION

The present invention relates to a method for suppressing resonance phenomena in the a-c network on the inverter side of a high-voltage d-c transmission system (HVDCTS). The invention further relates to an apparatus for carrying out the method.

With reference to FIG. 1, an HVDCTS is shown which is arranged between two a-c networks NA, NB and in which a first converter 1A of the HVDCTS which is connected in a first station (STA) to the first a-c network NA, is clocked by the network and is operated as a rectifier, impresses a predetermined d-c current $i_{dA}$ from the first a-c network and in a second station (STB), a second converter 1B which feeds into the second a-c network NB, is clocked by the network and is operated as an inverter, determines the level $U_{dB}$ of the transmitted d-c voltage.

In the preferred embodiment shown of a short coupling, the two stations are physically close together and the HVDCTS comprises only the d-c lines 2 and 3, a converter choke LA and LB being arranged at the d-c terminal of each converter. Each station contains a regulator 4A, 4B, the output signal of which determines, as the control voltage $\Delta x_A$, $\Delta x_B$, respectively, the control angle for the control unit STA and STB of the respective converter. The control units can be supplemented in the case of a digital control unit by supplementary devices, not shown, for instance, for linearizing the characteristic and/or for converting the given analog control voltage into a digital signal in the case of a digital control unit.

The control voltage $\Delta x_A$ determines the d-c voltage $U_{dA}$ at the d-c terminal of the converter 1A and therefore, if the d-c current $i_{dA}$ is set into the regulator 4A (current regulator), the control deviation of the d-c current fed-in by the converter 1A, the transmitted HVDCTS d-c current $i_d$ which is equal to the d-c current $i_{dB}$ which is taken from the converter 1B of the HVDCTS and is fed into the network NB, since in the case of a short coupling, power losses occurring in thyristors and chokes can be ignored ($i_d = i_{dA} = i_{dB}$). To the regulator 4B of station B (for instance, a voltage regulator or quenching angle regulator) can be fed, in the interest of holding the voltage of the network NB constant, the control deviation of the voltage amplitude of this network or, in the interest of an efficiency as high as possible for the power transmission and low reactive power, the control deviation of the quenching angle of the converter 1B can be pre-set by a predetermined designed quenching angle value which is a maximum as far as possible (i.e., is close to the inverter out-of-step limit). Its control voltage $\Delta x_B$ determines the d-c voltage $U_{db}$ associated with the impressed HVDCTS current $i_d$ at the d-c terminals of the converter 1B and thereby, the voltage level $U_d$ of the transmitted d-c voltage which is taken off between the two converter chokes LA and LB and, in the case of a long distance HVDCTS line, preferably at the end of the choke LA facing away from the converter 1A.

The two stations are coupled to each other via the HVDCTS in such a manner that any change of $\Delta x_B$ and $U_{dB}$ in station B causes, in accordance with the voltage drop at the HVDCTS, a change of $U_{dA}$ and thereby, a current change in station A which must be equalized by the current regulator 4A. On the other hand, any change of $\Delta x_A$ or $U_{dA}$ in the station A brings about a change of $i_d$ and $U_{dB}$ in station B, to which the regulator 4B responds in station B. In order to keep interfering effects of this coupling as low as possible, it has already been proposed to impress on the output signal $\Delta x_A$ of the current regulator 4A a pilot voltage $U_{dAv}$, which is taken off directly at the measuring stage for $U_d$ or is formed by means of a computing circuit as the model variable. Likewise, a pilot voltage $U_{dBv}$ can be impressed on the control voltage $\Delta x_B$, which is formed in a different manner, for instance, by calculating the inductive d-c voltage drop of the converter 1B.

For the network NB, the HVDCTS operates in practice so that the voltage oscillations are reflected at the converter, wherein a small ripple of $U_d$ and $i_d$ is produced which is equalized by the current regulator 4A if this current regulator works fast enough. In FIG. 1, it is indicated that the network NB can contain a disturbing voltage oscillation which in this manner acts like an oscillation coupled into the HVDCTS circuit via an interference quantity $U_B$ for the control angle $\Delta x_B$ with a generally changed amplitude, phase and frequency.

If in the network, this interfering oscillation is located in the vicinity of the resonance frequency of the network and if the current regulator 4A is not able to equalize the resonance frequency generated in the d-c circuit, this interfering oscillation can thereby be fanned-up in such a manner that considerable ripple of $U_d$ and $i_d$ in the HVDCTS circuit comes about, in which the d-c voltage corresponding to the nominal voltage provided is superimposed by a "resonance oscillation" which can exceed, for instance, 30% of the nominal voltage and can ultimately lead to the situation that the entire system must be shut down. This is the case, for instance, in a specific case, in which the resonance frequency of the network NB is in the vicinity of the second harmonic of the network NB, it having been found that the interfering resonance frequency of the d-c circuit is approximately equal to the fundamental (60 Hz) of the 3-phase network NB.

SUMMARY OF THE INVENTION

It is therefore an object of the present invention to suppress such a resonance phenomenon in an HVDCTS between the a-c voltage on the inverter side and the transmitted d-c voltage or the transmitted d-c current.

The basic idea of the invention is to determine the resonance phenomenon (in the example, therefore, the 60Hz oscillation) in the d-c circuit and to attenuate it by intervention into the control of the rectifier station. Since the control 4A of this station is as a rule, too sluggish for this purpose, a control variable corresponding to the resonance phenomenon is applied as a pilot voltage $\Delta U_A$ of (possibly already servo-controlled by the pilot voltage $U_{dAv}$) control voltage $\Delta x_A$ at the output of the regulator 4A. While thereby the resonance oscillation in the d-c circuit is ultimately also coupled into the network NA, the resonance frequency of the network NA is almost always different from the resonance frequency of the network NB, and in addition, the phase and frequency of the network NA always changes somewhat relative to the network NB, further resonance phenomena in the network NA do not come about, while the resonance of the network NB can be damped effectively.

BRIEF DESCRIPTION OF THE DRAWINGS

The invention will be explained in greater detail, in the following detailed description with reference to the drawings, in which.

DETAILED DESCRIPTION

Figure 1:
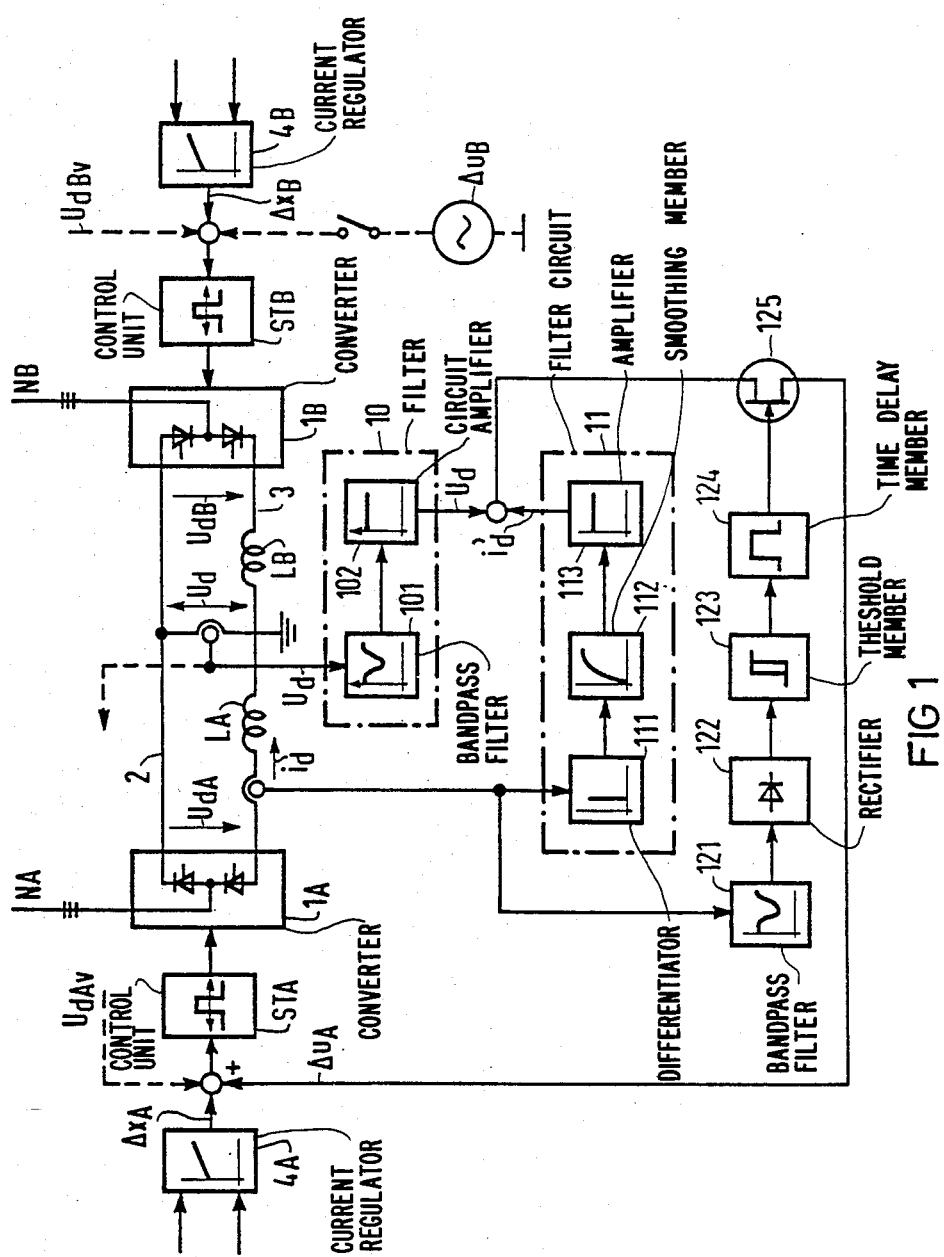
FIG. 1 is a block diagram of the present invention.

If the operating point of station B, particularly the interfering frequency and the voltage $U_{dB}$ (or the voltage $U_d$ or the current $i_d$ caused thereby) are known well enough and if the actual value of the HVDCTS voltage $U_d$ is determined without delay and the change of the control angle of the first converter can be adjusted without delay, it would be sufficient to filter out ("isolate") the resonance oscillation component (in the example, therefore, the 60Hz oscillation) from the HVDCTS voltage $U_d$ without phase shift. If then the isolated oscillation component is added to the control voltage with amplification tuned to the operating point, it can be achieved thereby that the output voltage $U_{dA}$ is changed proportionally to and in phase with the HVDCTS volta $U_d$ and a constant $i_d = i_{dA}$ is thereby impressed on the choke LA. The HVDCTS then reflects for all practical purposes no longer the interference oscillation contained in the network NB but it becomes permeable therefor and the cause of the resonance oscillation is thereby largely eliminated and the resonance is damped.

In principle, the same can be achieved if the resonance oscillation component of the HVDCTS current $i_d$ is filtered out and is added as a pilot variable to $\Delta x_A$. However, the current $i_d$ follows the change generated by a periodic change of the control angle controlling the converter 1A with a respective phase shift of 90° so that a phase rotation of 90° can be produced between the pilot quantity derived from $i_d$ and the change of the control angle due to the pilot quantity.

The idealizing conditions (particularly determination and adjustment of the voltage $U_d$ without delay and filtering out the resonance oscillation component without phase rotation) do not exist, however, in reality. Thus the measuring transformers which are required for determining and stepping down the high voltage $U_d$ have a considerable time constant which is frequently increased still further by additional smoothing. Also the control unit of the converter 1A exhibits a switching delay and additional smoothing. The control circuit which leads from the measuring transformer for determining the oscillation component to the actual value of the oscillation component via the addition of the pilot variable derived from the oscillation component, therefore has a time constant ("time constant of the pilot") which must be taken into consideration in order to produce the desired phase equality of $U_{dA}$ and $U_d$.

On the other hand, filtering out the oscillation component which is superimposed on the d-c voltage or the d-c current in the HVDCTS d-c circuit is as a rule possible only with phase rotation. This, however, can be utilized for equalizing through appropriate design of the required filter circuit, just that time constant of the pilot, i.e., the phase angle belonging to this time constant and to the frequency of the resonance oscillation.

The filter circuit for determining the measured value is therefore tuned to this phase angle $\phi$. Thereby, however, heavy damping is possible only for a given operating point. If therefore only one pilot quantity is formed, the design of the filter circuit (phase rotation and gain) must follow the change of the operating point in the event of a change of the operating point in order to obtain optimum damping also in the case of a change of the amplitude of $U_d$ or $i_d$ or of the frequency of the resonance oscillation.

If, in addition, the pilot quantity is derived from the d-c current $i_d$, it must be added that this pilot quantity damps just that oscillation of $i_d$ which is required for forming the pilot quantity itself. Thus, the better the damping is to be, so much more difficult becomes the determination of the damping pilot quantity.

These difficulties are avoided if both measures are combined with each other. It is then sufficient to use for the formation of the control input derived from the measured voltage value a filter circuit which is tuned to a central operating point. Any deviation of the actual operating point from this mean operating point then means a detuning of the resonance conditions corresponding to overcompensation or undercompensation of the resonance oscillation, from which a resonance oscillation in the measured current value follows. From this current resonance can then be formed a further pilot quantity, with gain, by a phase rotation which amounts to about 90°. By the addition of the total pilot quantity resulting as the sum of both pilot quantities, an optimum damping for operating points variable within a wide operating range can be achieved with constant lay-out of the circuit.

In this connection it has been found that the tuning of the filter circuit for the measured current value is not very critical. In particular, it is frequently not necessary to take also into consideration the phase angle due to the mentioned time constant of the pilot for the phase rotation of the current resonance oscillation component beyond the 90° phase shift.

In the embodiment of FIG. 1, the filter circuit 10 is realized by a bandpass filter 101 tuned to the mean resonance frequency of the d-c circuit, i.e., 60 Hz, with a following amplification stage 102. This bandpass filter accordingly isolates this frequency of the d-c circuit from the d-c component and the harmonics caused by the converter operation, and brings about at the same time the desired phase shift by the angle $\phi$.

Any deviation from the operating point on which the filter circuit 10 is based makes it necessary that the current $i_d$ has ripple. Depending on how, for instance, the d-c voltage $U_d$ or the frequency of NB is changed, overcompensation or undercompensation of the resonance of the network can result by the output voltage $U'_d$ of the filter circuit 10.

It is therefore provided advantageously to form also a quantity $i'_d$ determining the d-c current $i_d$ and to impress the control voltage $\Delta x_A$ in such a manner that thereby the over-or undercompensated oscillation of the d-c voltage $U_d$ is coupled with positive or negative feedback to an additional oscillation corresponding to the current resonance.

For this purpose, also the resonance oscillation contained in the measured value $i_d$ of the HVDCTS is isolated with a phase rotation of about 90°, is amplified suitably and is impressed on the control voltage $\Delta x_A$ together with $U'_d$. Filtering out the current resonance frequency and its phase rotation is preferably realized in the filter circuit 11 of the arrangement by forming the derivative d/dt ($i_d$) of the d-c current, where the differentiator 111 can be followed by a smoothing member 112 with little smoothing. Furthermore, an amplifier 113 is connected thereto. The two filter circuits 10 and 11 are tuned to each other and to the operating range of the HVDCTS in such a manner that optimum smoothing is achieved practically for all occurring operating points.

According to FIG. 1, it is further provided advantageously to execute the damping addition of the pilot quantity $U_A$ only if a disturbing resonance occurs in the network NB and thereby, a noticeable resonance in the d-c circuit. Therefore, a filter tuned to the interfering resonance frequency (in the example, 60 Hz) of the d-c circuit for the measurement value of $U_d$ (or preferably of $i_d$) is provided which isolates the resonance frequency, forms its amplitude via a rectifier 122 and feeds the latter to a threshold member 123. If the resonance amplitude exceeds a predetermined critical threshold value, a time delay member 124 is triggered which drives a transistor switch 125 into conduction. The switch 125 then adds during this intervention time the damping pilot quantity $\Delta U_A$ to the control voltage, while the resonance phenomenon in the network NB is damped and also disappears quickly completely, depending on the network configuration.

Figure 2:
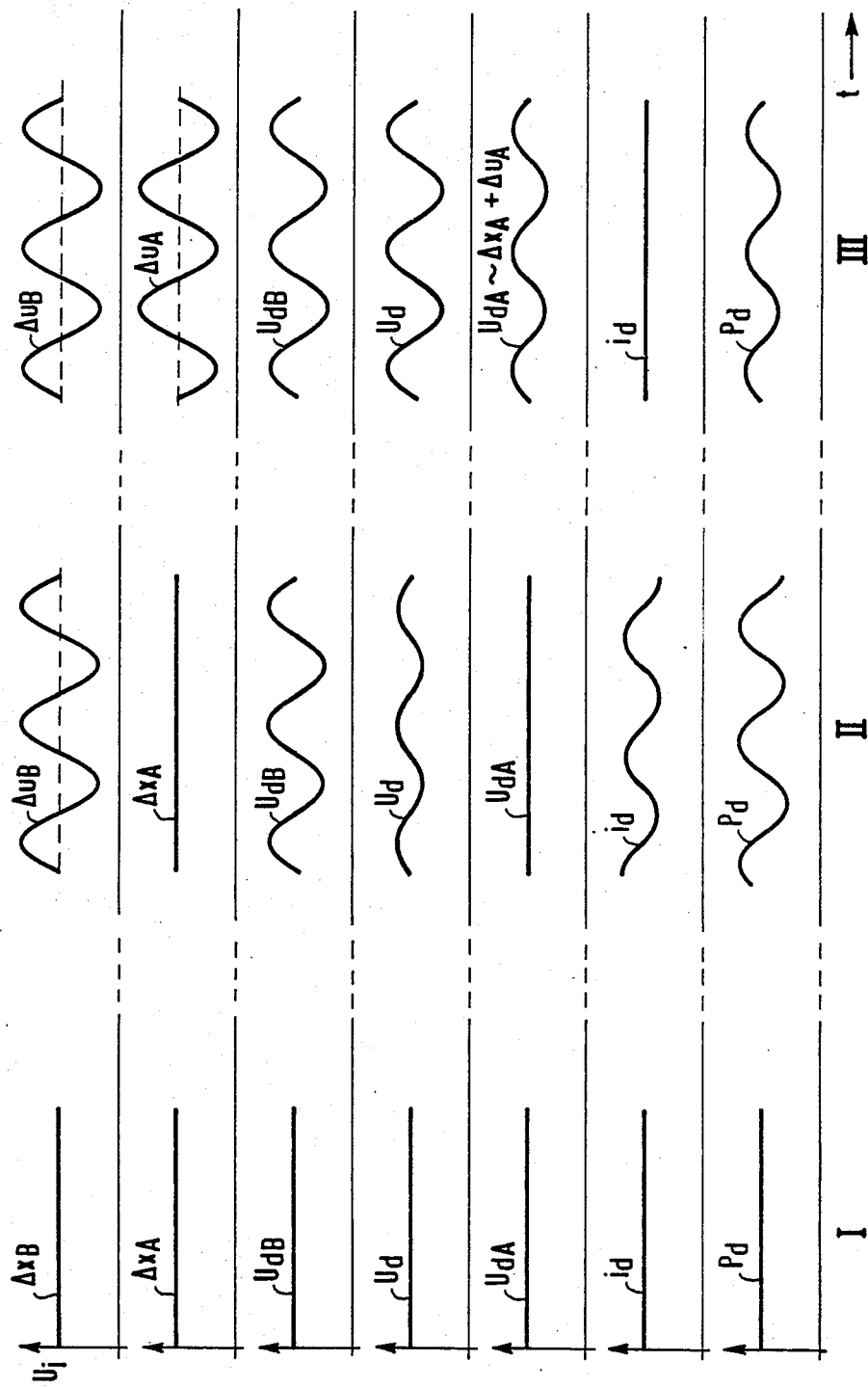
FIG. 2 is a graph showing signals present in the diagram of FIG. 1.

In FIG. 2, three states of the device according to FIG. 1 are shown. First, state I will be considered, in which the two networks NA and NB contain only the respective fundamental and their voltage amplitudes are therefore proportional to the control voltage $\Delta x_A$ and $\Delta x_B$ and are therefore constant. In this undisturbed case, also the d-c voltages $U_d$, $U_A$ and $U_{dB}$ as well as the d-c current $i_d$ and the transmitted active power $P_d$ are constant.

If now the resonance frequency of the network NB is equal to the second harmonic of this a-c voltage network, a corresponding oscillation is excited and is fanned-up to a considerable amplitude. This resonance oscillation generates in the measured value $U_d$ of the d-c voltage a superimposed resonance frequency with the frequency of the fundamental, which can be simulated, for instance, by the provision that the corresponding resonance oscillation $\Delta U_B$ is superimposed on the control angle of the control unit 1B. With the occurrence of the resonance in the network NB, the HVDCTS changes therefore from the undisturbed state I to the resonance state II.

The current regulator 4A cannot compensate this oscillation and remains practically at its constant value. Consequently, also the d-c output voltage $U_{dA}$ is constant, while the d-c voltage $U_{dB}$ and $U_d$ exhibit the oscillation generated by $\Delta U_B$. Corresponding to the voltage difference $U_{dA} - U_{dB}$, a resonance frequency is also produced in the d-c current $i_d$, so that the transmitted active power $P_d$ contains considerable pulsations. The HVDCTS therefore becomes permeable to a certain extent to the resonance phenomena of the network NB which are ultimately coupled into the network NA and are damped only there.

If now the pilot control variable $\Delta U_A$ is formed from $U_d$ and $i_d$, the d-c voltage $U_{dA}$ is now proportional to $\Delta x_A + \Delta U_A$, where $U_A$ is now determined so that the driving voltage $U_{dB} - U_{dA}$ in the HVDCTS becomes constant and thereby generates a constant d-c current $i_d$.

By keeping the HVDCTS current constant in this manner, the permeability of the HVDCTS and therefore the damping of the resonance in NB is greatly increased and, after the switch 125 is closed, changes from state II quickly back to state I.

To better illustrate the action of the pilot quantity $\Delta U_A$ better, an operating state is shown by III in FIG. 2, in which the state with the excited resonance frequency is maintained artificially by adding a further control variable $\Delta U_B$ to the output of the regulator 4B in the network NB. With this simulation it can be seen clearly that in state III, the d-c voltage $U_{dB}$, $U_d$ and $U_{dA}$ are proportional and of the same phase so that the desired constancy of the d-c current is assured. However, this is accompanied by a pulsation of the active power $P_d$, where now the added pilot control quantity $\Delta U_A$ couples a certain amount of harmonics into the network NA. Since, however, state III, in which the resonance in the network NB has a considerable amplitude and the pilot control quantity $\Delta U_A$ is added, occurs only immediately after the switch 125 is closed and thus state III is assumed to be only temporary during the change from state II to state I, the pulsation of the active power and the interference frequency coupled into the network NA are practically without importance.

It becomes possible thereby to suppress a resonance phenomenon in the network NB by appropriate intervention into the control of the rectifier by practically eliminating the cause, namely, the reflection of the interference oscillation.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A method for suppressing resonance phenomena in the a-c voltage on the inverter side of a high-voltage d-c transmission system disposed between two a-c voltage networks, wherein a first converter which is connected to a first of said voltage networks is clocked by the network and is operated as a rectifier, said first converter supplying current from the first a-c voltage network to the d-c circuit of the high voltage d-c transmission line, and producing a d-c current ($i_d$) which is determined by a preset control voltage ($\Delta x_A$) and a resonance oscillation component ($U'_d$) formed from said preset control voltage ($\Delta x_A$) and a measured value ($U_d$) taken off at the d-c circuit of the high voltage d-c transmission system, and wherein a second converter which feeds into the second of said a-c voltage networks and is operated as an inverter is provided for determining the transmitted d-c voltage ($U_{dB}$) of the high voltage d-c transmission system, the resonance oscillation component ($U'_d$) of the voltage being filtered out from the measured value ($U_d$) with phase rotation and amplitude amplification and being added as a pilot control quantity ($\Delta U_A$) to the control voltage ($\Delta x_A$) of the first converter.

2. The method recited in claim 1, wherein the resonance oscillation component ($U'_d$) is filtered from the measured value ($U_d$) of the transmitted d-c voltage and its phase rotation and amplification is adapted to an operating point given by at least one of the frequency of the resonance oscillation component, the amplitude of the d-c current or d-c voltage and by a quantity determining phase shift, the phase shift determining at least one of the switching delay time of the first converter, a phase shift in the pickup of the measured value and a further phase shift determining a time constant of the pilot control quantity.

3. The method recited in claim 1, wherein the resonance oscillation component is filtered from a measured value of the transmitted d-c current ($i_d$), the phase shift and amplification of the resonance oscillation component being tuned to an operating point of the high voltage d-c transmission system and to the phase shift between the measured value of the transmitted d-c current and a d-c voltage ($U_{dA}$) generated by the first converter.

4. The method recited in claim 3, wherein pilot control variables ($U'_d$, $i'_d$) are formed from said measured value ($U_d$) and the d-c current ($i_d$); both said pilot control variables are added to the control voltage ($\Delta x_A$); and the phase shifts and amplifications of both said variables are constant and tuned such that stable damping is achieved for variable operating points.

5. The method recited in claim 2, wherein the measured value of the transmitted d-c voltage is sensed at an end of a converter choke coupled to the d-c voltage output of the first converter.

6. The method recited in claim 3, wherein said pilot control variable ($i'_d$) of the high voltage d-c transmission system is filtered from the measured value ($i_d$) of the high voltage d-c transmission systeme d-c current while the phase is shifted approximately 90°.

7. The method recited in claim 6, wherein the filtered-out and phase-rotated pilot control variable ($i'_d$) of the high voltage d-c transmission line current is obtained by differentiation.

8. The method recited in claim 7, further comprising the step of smoothing the measured current value.

9. The method recited in claim 1, wherein only a temporary addition of the pilot control quantity is provided if the amplitude of either of the filtered-out pilot control variables exceeds a predetermined limit.

10. An apparatus for suppressing resonance phenomena in the a-c voltage on the inverter side of a high voltage d-c transmission system, said system including a regulator for supplying a control voltage ($\Delta x_A$), a first converter addressed by the control voltage and connected to a first a-c voltage network, said first converter impressing on a subsequent converter choke a d-c current ($i_d$) determined by the regulator; said apparatus including a measuring stage subordinated to the converter choke for forming a voltage ($U_d$) of the high voltage d-c transmission system for determining a pilot control quantity ($\Delta U_A$) which can be added to said control voltage; said high voltage d-c transmission system comprising a pair of lines connected to the inputs on the d-c voltage side of a second converter feeding into a second a-c voltage network, said apparatus further comprising means for filtering the measured value of the high voltage d-c transmission system voltage ($U_d$) which is tuned to the frequency of a resonance oscillation due to the resonance phenomenon of the second a-c voltage network and which forms the oscillation component of the voltage measurement value corresponding to this resonance frequency, while rotating the phase and amplification of the amplitude, thereby forming said pilot quantity ($\Delta U_A$).

11. The apparatus recited in claim 10, further comprising means for measuring a high voltage d-c transmission system current ($i_d$), second filter means coupled to the measuring means for filtering the resonance oscillation contained in the measured current value and for shifting the phase and amplifying the amplitude of said oscillation, and means for forming the pilot quantity ($\Delta U_A$) by addition of the output quantities of both said filter means.

12. The apparatus recited in claim 11, wherein the second filter means comprises a differentiator means for the measured current value and a series-connected smoothing means coupled to the output of the differentiator.

13. The apparatus recited in claim 10, further comprising pick-up means which senses the amplitude of the resonance oscillation contained in the measured current value or the measured voltage value; threshold stage means coupled to the pickup means; time delay means coupled to the threshold stage means which is triggered if a predetermined threshold of the amplitude is exceeded; and switch means responsive to an output signal of the time delay means for supplying the pilot quantity to a subsequent adding means, said subsequent adding means having said control voltage ($\Delta X_A$) also coupled thereto.

* * * * *